US006061908A

United States Patent [19]

DeMarey et al.

[11] Patent Number: 6,061,908

[45] **Date of Patent: *May 16, 2000**

[54] ENERGY-EFFICIENT GRINDING ROLLS FOR COAL PULVERIZERS

[75] Inventors: Brian P. DeMarey, Bondsville, Mass.; James F. Durant, Bloomfield, Conn.; Martin J. Kozlak, Enfield, Conn.; Robert S. Prairie, Vernon, Conn.; Reed S. C. Rogers, Avon, Conn.; Anthony J. Rooney, Wethersfield, Conn.; Gregory R. Strich, Enfield, Conn.

[73] Assignee: Combustion Engineering, Inc., Windsor, Conn.

[ * ] Notice: Under 35 U.S.C. 154(b), the term of this patent shall be extended for 329 days.

[21] Appl. No.: 08/928,311

[22] Filed: Sep. 12, 1997

Related U.S. Application Data

[63] Continuation of application No. 08/576,995, Dec. 26, 1995, abandoned.

[51] Int. Cl.[7] .......... B23P 15/00

[52] U.S. Cl. .......... 29/895.3

[58] Field of Search .......... 241/117–121, 293, 241/294, 295; 29/895.3

[56] References Cited

U.S. PATENT DOCUMENTS 1,009,520 11/1911 Hunt .

*Primary Examiner*—Mark Rosenbaum
*Attorney, Agent, or Firm*—Russell W. Warnock

[57] ABSTRACT

An energy-efficient grinding roll for employment in a pulverizer operative for effecting the pulverization of solid material therein. The energy-efficient grinding roll includes a body portion formed of a first type of material, an external surface formed of a second type of material, and tread-like means of preestablished dimensions and preestablished spacing provide on the external surface such that the energy-efficient grinding roll is capable of achieving as much as a 15% reduction in the energy required to pulverize solid material when compared with the use of standard grinding rolls.

14 Claims, 3 Drawing Sheets

ENERGY-EFFICIENT GRINDING ROLLS FOR COAL PULVERIZERS

This is a Continuation, of application Ser. No. 08/576,995, filed Dec. 26, 1995 now abandoned.

BACKGROUND OF THE INVENTION

This invention relates to rolls, and more specifically to an energy-efficient grinding roll of the type that is intended to be used in pulverizers for purposes of effecting therewith the pulverization within the pulverizer of material such as, for example, coal.

An essential component of any steam generation system of the type, which utilizes coal as a fuel, is the apparatus in which the coal is pulverized in order to render it suitable for such usage. Although the prior art is replete with examples of various types of apparatus that have been employed for purposes of accomplishing coal pulverization, one form of coal pulverizer, which in particular has frequently been used for this purpose, is that commonly referred to as a bowl mill. The latter obtains its name principally from the fact that the pulverization, i.e., grinding, of the coal that takes place therewithin occurs on a grinding surface, which insofar as configuration is concerned resembles that of a bowl.

For an exemplary showing of a prior art form of bowl mill, reference may be had to U.S. Pat. No. 4,706,900 entitled "Retrofitable Coiled Spring System," which issued on Nov. 17, 1987 and which is assigned to the same assignee as the present invention. U.S. Pat. No. 4,706,900 contains a teaching of both the nature of the construction and the mode of operation of a bowl mill that is suitable for use for purposes of effecting the pulverization of the coal that is used to fuel a coal-fired steam generator. As set forth in this patent, the essential components of such a bowl mill are a body portion, i.e., housing within which a grinding table is mounted for rotation, a plurality of grinding rolls that are supported in equally spaced relation one to another, the plurality of grinding rolls are suitably arranged in such a manner so as to coact with the grinding table such that coal which is disposed on the surface of the grinding table is capable of being ground, i.e., pulverized, by the rolls, coal supply means for feeding to the surface of the grinding table the coal which is to be pulverized in the bowl mill, and air supply means for providing to the interior of the body portion the air that is required in the operation of the bowl mill.

In order to satisfy the demands for pulverized coal of a coalfired steam generation system that embodies a conventional form of construction, there commonly exists a need to employ a plurality of bowl mills of the type which are shown in the aforereferenced patent. In this regard, note is further made here of the fact that in terms of capacity each of these bowl mills may have a capacity of up to one hundred tons of pulverized coal. In addition to possessing the capability of operating at its maximum capacity, each of these bowl mills must also be capable of operating at less than full capacity, i.e., at some percentage thereof, e.g., 25%, 50%, 75%, etc. Finally, these bowl mills must also be capable of use with a variety of types of coal that have dissimilar grinding characteristics.

With further reference to the aforementioned patent, there is depicted therein grinding rolls that embody one type of construction. Over the years, however, grinding rolls embodying many other different types of construction, in addition to that depicted in the aforementioned patent, have been proposed for use in the bowl mills. In this regard, by way of exemplification and not limitation, one such other type of construction of grinding rolls of the kind that are intended to be utilized in bowl mills forms the subject matter of U.S. Pat. No. 3,409,236 entitled "Segmented Grinding Roll Assembly," which issued on Nov. 5, 1968 and which was assigned to the same assignee as the present invention. In accordance with the teachings of U.S. Pat. No. 3,409,936, there is provided a grinding roll that is made up of a number of pieces or segments, which segments are secured to an inner cylindrical member by means of nuts and bolts. The heads of the bolts are cast integrally with the segments. Malleable metal washers are positioned between each segment and the inner cylindrical member to ensure a tight fit between the segments and member.

By way of exemplification and not limitation, another such type of construction of grinding rolls of the kind that are intended to be utilized in bowl mills forms the subject matter of U.S. Pat. No. 4,181,264 entitled "Centrifugally Or Static Cast Grinding Rolls," which issued on Jan. 1, 1980 and which is assigned to the same assignee as the present invention. In accordance with the teachings of U.S. Pat. No. 4,181,264, there is provided a grinding roll wherein the grinding surface of the grinding roll is made up of a removable roller sleeve, which is securely held on the journal bearing housing by means of wedge lock rings located at each end of the roller sleeve. These wedge lock rings, along with the roller sleeve, can be easily assembled, and provide positive locking of the removable roller sleeve onto the journal bearing housing, even if there are slight irregularities on the tapered surfaces of the roller sleeve.

By way of exemplification and not limitation, yet another such type of construction of grinding rolls of the kind that are intended to be utilized in bowl mills, and more specifically, the method of manufacture thereof forms the subject matter of U.S. Pat. No. 4,389,767 entitled "Method Of Manufacturing Pulverizer Rolls," which issued on Jun. 28, 1983 and which is assigned to the same assignee as the present invention. In accordance with the teachings of U.S. Pat. No. 4,389,767, there is provided a method that is particularly suited for manufacturing a grinding roll of the type, which is designed to be embodied in a bowl mill so as to be operative therein for purposes of effecting the pulverization of a material such as coal through the coaction of the grinding roll with another surface with which the bowl mill is provided for this purpose. The subject method includes the steps of forming from a material that is characterized by its ease of machinability a body having the general configuration of a grinding roll, providing through the center of the body a suitably dimensioned through passage capable of having a support member positioned therewithin in mounted relation thereto, shaping the outer surface of the body in accordance with the predicted wear characteristics that the grinding roll is expected to experience based on the nature of the use to which the grinding roll is intended to be put such that the contour thereof replicates that of a worn grinding roll, and applying a substantially uniform layer of a material characterized by its wear-resistant qualities to the outer surface of the body.

By way of exemplification and not limitation, yet still another such type of construction of grinding rolls of the kind that are intended to be used in bowl mills forms the subject matter of U.S. Pat. No. 4,604,781 entitled "Highly Abrasive Resistant Material And Grinding Roll Surfaced Therewith," which issued on Aug. 12, 1986 and which is assigned to the same assignee as the present invention. In accordance with the teachings of U.S. Pat. No. 4,604,781, there is provided a grinding roll that has its external surface fabricated from an alloy, which is characterized by its highly abrasive resistant qualities. This alloy from which the external surface of the grinding roll is fabricated is capable of being cast or applied to the grinding roll in the form of a weld overlay and comprises, by weight percentages, 4.0–6.0% Carbon; 3.0–14.0% Manganese; 1.0–2.5% Silicon; 15.0–30.0% Chromium; and 4.0–6.0% Molybdenum; with 0.5%–2.0% Boron being added thereto, the balance being iron and incidental impurities.

By way of exemplification and not limitation, yet further still another such type of construction of grindingrolls of the kind that are intended to be utilized in bowl mills forms the subject matter of U.S. Pat. Nos. 4,610,073 and 4,610,401. That is, U.S. Pat. No. 4,610,073 is directed to the method of manufacture of the grinding roll and to this end is entitled "Trimetal Pulverizer Roll And A Method Of Manufacture Thereof." U.S. Pat. No. 4,610,073 issued on Sep. 9, 1986 and is assigned to the same assignee as the present invention. Moreover, U.S. Pat. No. 4,610,401 is directed to the grinding roll per se and to this end is entitled "Trimetal Pulverizer Roll." U.S. Pat. No. 4,610,401 also issued on Sep. 9, 1986 and also is assigned to the same assignee as the present invention. In accordance with the teachings of U.S. Pat. No. 4,610,073, there is provided a method of manufacturing a grinding roll, which has a trimetal form of construction and which is of the type suitable for use in a bowl mill for purposes of effecting the pulverization therewith of a material such as coal. The subject method includes the steps of forming from a material that is characterized by its ease of machinability a body having the general configuration of a roll, providing through the center of the body a suitably dimensioned through passage capable of having a shaft-like support member positioned therewithin in mounted relation thereto, affixing in supported relation to the body a first substantially uniform layer of material having medium wear-resistant characteristics, and affixing in supported relation to the first layer of material a second substantially nonuniform layer of material having highly abrasive resistant characteristics. On the other hand, in accordance with the teachings of U.S. Pat. No. 4,610,401 there is provided a grinding roll of the type that is particularly suited for embodiment in a bowl mill wherein the grinding roll coacts with another surface within the bowl mill to effect the pulverization therewithin of a material such as coal. The subject grinding roll embodies a trimetal form of construction. More specifically, the core material, i.e., the first or inner layer, of the trimetal grinding roll consists of a relatively soft material that is noted for its good machinability. The next, i.e., second or intermediate, layer of the trimetal grinding roll comprises a material that has medium wear-resistant qualities. The last, i.e., third or outer, layer of the trimetal grinding roll comprises a material having highly abrasive resistant qualities.

Thus, although grinding rolls constructed in accordance with the teachings of the seven issued U.S. patents to which reference has been made hereinbefore have been demonstrated to be operative for the purpose for which they have been designed, there has nevertheless been evidenced a need for such grinding rolls to be improved. To this end, recent industry trends with regard to the coal being demanded thereby is having the effect of necessitating that coal pulverizers and in particular those coal pulverizers commonly referred to as bowl mills possess the capability of being able to pulverize coal to a significantly finer degree than that which has been the conventional practice heretofore. Namely, in accordance with this trend, bowl mills more and more frequently are being required to possess the capability of being able to pulverize coal therewithin to newly established minimum fineness levels that are well below the fineness levels heretofore sought. The newly established minimum fineness levels to which reference is made here are the following: approximately 0% on a 50-mesh sieve, 1.5% on a 100-mesh sieve and more than 85% passing through a 200-mesh sieve. It is to be noted in this regard that to those who are skilled in this industry the size of a 50-mesh sieve, a 100-mesh sieve and a 200-mesh sieve are known to be such as to permit in accordance with established practice the passage therethrough of particles having a size of approximately 300 microns, 150 microns and 74 microns, respectively.

In order to be able to satisfy this demand for pulverized coals that are significantly finer than those that have been demanded before, it has been found that the bowl mills, which heretofore have commonly been employed for purposes of effecting therewith the pulverization of the coal, must be modified in order to possess the capability of producing such finer coals. To this end, in the case of existing bowl mills commonly such modification involves the retrofitting of the existing bowl mill with what those in the industry refer to as a rotary classifier. Similarly, new bowl mills frequently now incorporate therein a rotary classifier as original equipment. However, providing such significantly finer pulverized coal has not been able to be accomplished heretodate without adversely impacting the performance of the bowl mill, which is utilized to accomplish the pulverization of the coal to such significantly finer levels. Namely, it has been found that in order to achieve the fineness levels of coal that are being demanded, the grinding energy required to be expended by the bowl mill to achieve such fineness levels of coal is considerably more than the grinding, energy that must be expended by the bowl mill for purposes of accomplishing the pulverization of coals to lesser fineness levels.

In addition to the fact that significantly more energy is required to be expended by the bowl mill in order to accomplish the pulverization of the coal to such minimum fineness levels, another phenomena, referred to as "rumble" for lack of a better description of this phenomena, has proven to be something that can also serve to disadvantageously characterize the operation of a bowl mill when the bowl mill is being utilized to pulverize coal to the minimum fineness that the pulverized coal is now being required to possess in order to satisfy the demands of industry. "Rumble" is essentially a phenomena wherein the bowl mill produces a rumbling noise accompanied by significant vibrating of the bowl mill, which in turn conceivably can result in damage being suffered by the bowl mill as well as by surrounding equipment, etc., if the "rumble" is not eliminated. To date, "rumble" appears to be a phenomena that is encountered principally in bowl mills that are being employed to pulverize coal to fineness levels significantly below the fineness levels that had heretofore been sufficient to satisfy the demands of industry.

To thus summarize, a need has been evidenced in the prior art for an energy-efficient grinding roll that would be particularly suited for use in pulverizers, and in particular bowl mills, for purposes of effecting the pulverization therein of material such as, for example, coal. Moreover, such an energy-efficient grinding roll could be being employed in bowl mills for purposes of effecting therewith the pulverization of coal to fineness levels significantly below the fineness levels that had heretofore been sufficient to satisfy the demands of industry. Furthermore, through the use of such an energy-efficient grinding roll energy savings would be attainable when such an energy-efficient grinding roll is being employed in bowl mills for purposes of effecting therewith the pulverization of coal to the fineness levels that had heretofore been sufficient to satisfy the demands of industry. Last but not least, such an energy-efficient grinding roll would be operative when employed for purposes of effecting the pulverization of coal therewith in bowl mills equipped with rotary classifiers to inhibit the initiation of "rumble" within such bowl mills when the bowl mills are being operated under normal conditions.

It is, therefore, an object of the present invention to provide a new and improved form of grinding roll of the type that is intended to be used in pulverizers, and in particular bowl mills, for purposes of effecting the pulverization therein of material such as, for example, coal.

It is another object of the present invention to provide such a grinding roll, which is characterized in that energy savings on the order of at least 15% are attainable through the use thereof in a bowl mill.

It is still another object of the present invention to provide such an energy-efficient grinding roll, which is characterized in that energy savings are attainable therewith when such an energy-efficient grinding roll is being employed in bowl mills for purposes of effecting therewith the pulverization of coal to fineness levels below those that had heretofore been sufficient to satisfy the demands of industry.

A further object of the present invention is to provide such an energy-efficient grinding roll, which is characterized in that energy savings are attainable therewith when such an energy-efficient grinding roll is being employed in bowl mills for purposes of effecting therewith the pulverization of coal to the fineness levels that had heretofore been sufficient to satisfy the demands of industry.

A still further object of the present invention is to provide such an energy-efficient grinding roll, which is characterized in that when such an energy-efficient grinding roll is employed for purposes of effecting the pulverization of coal therewith in bowl mills equipped with rotary classifiers such an energy-efficient grinding roll is operative to inhibit the initiation of "rumble" within such bowl mills when the bowl mills are being operated under normal conditions.

A still another object of the present invention is to provide such an energy-efficient grinding roll, which is suitable for employment in a bowl mill that embodies a rotary classifier.

Yet an object of the present invention is to provide such an energy-efficient grinding roll, which is suitable for employment in a bowl mill that does not embody a rotary classifier.

Yet a further object of the present invention is to provide such an energy-efficient grinding roll, which is suitable for installation in new bowl mills.

Yet another object of the present invention is to provide such an energy-efficient grinding roll, which is capable of being retrofitted into existing bowl mills.

Yet still another object of the present invention is to provide such an energy-efficient grinding roll, which is relatively inexpensive to provide, is easy to employ and is characterized by the energy savings that are attainable therewith as compared to the energy savings, if any, that have been possible to be realized from the grinding rolls which have heretofore been available for use for similar purposes.

SUMMARY OF THE INVENTION

In accordance with the present invention there is provided a grinding roll of the type that is particularly suited for employment in a pulverizer, and in particular a bowl mill. When mounted in the bowl mill, the subject grinding roll is designed to be operative to coact with another surface of the bowl mill in order to accomplish the pulverization within the bowl mill of material such as, for example, coal. To this end, the nature of the construction of the subject grinding roll is such that the subject grinding roll embodies basically the configuration of a frustum of a right circular cone. Namely, the subject grinding roll, generally speaking, is circular in shape with one end thereof being of a lesser diameter than the other end thereof. Continuing, the subject grinding roll is provided with tread-like means on at least some of the outer surface of the circular portion thereof. The tread-like means comprises a plurality of rib-like members, each of which embodies preestablished dimensions, that are spaced at a preestablished distance one from another around the circumference of the outer surface of the circular portion of the subject grinding roll and such that the rib-like members extend substantially in the longitudinal direction of the subject grinding roll. Finally, also there is formed through essentially the center of the subject grinding roll a passage which is suitably dimensioned for receiving therewithin a shaft-like member on which the subject grinding roll is designed to be mounted in supported relation thereto.

DESCRIPTION OF A PREFERRED EMBODIMENT

Figure 1:
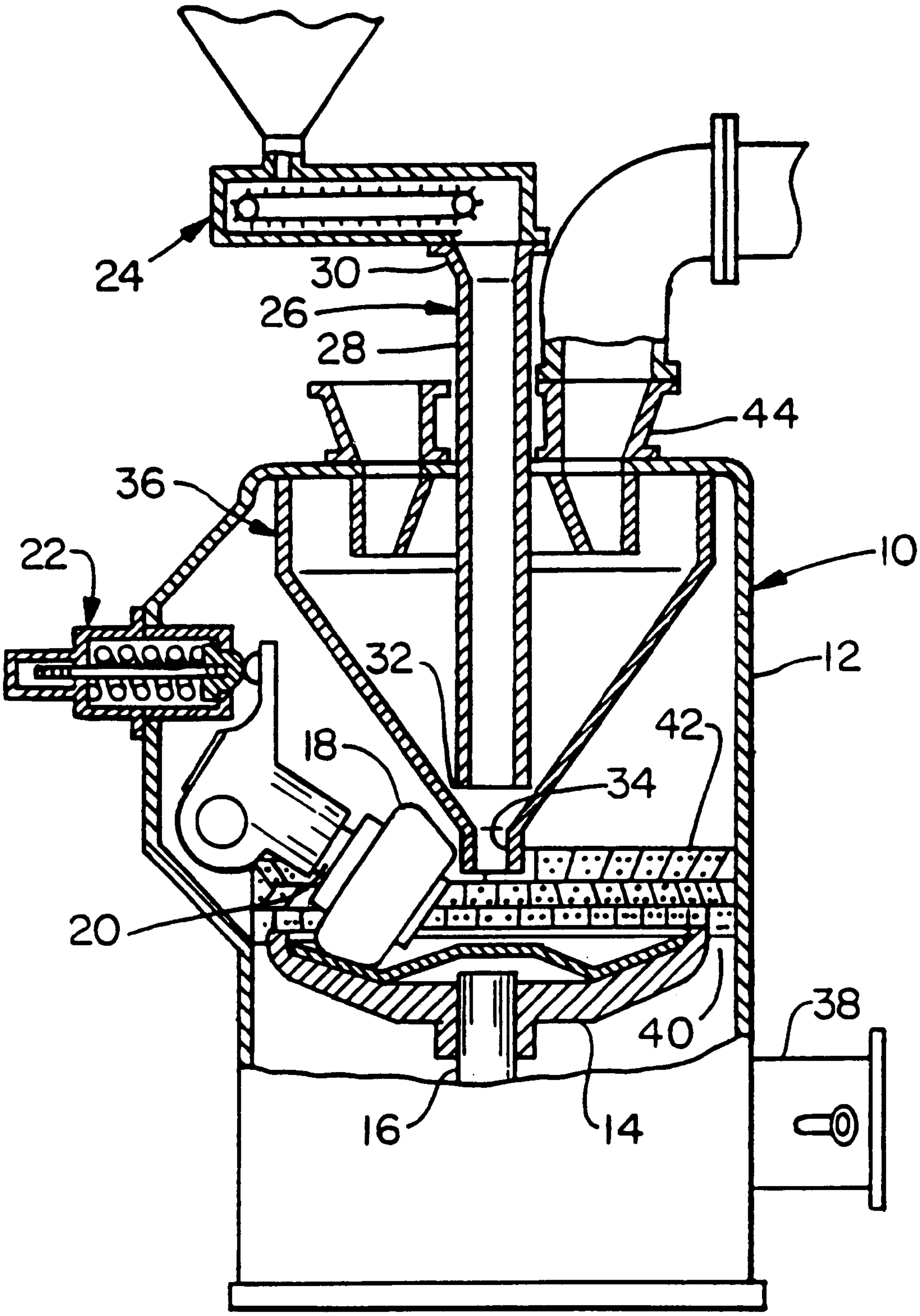
FIG. 1 is a side elevational view partially in section of a bowl mill equipped with an energy-efficient grinding roll constructed in accordance with the present invention.

Referring now to the drawing, and more particularly to FIG. 1 thereof, there is depicted therein a bowl mill, generally designated by reference numeral 10. Inasmuch as the nature of the construction and the mode of operation of bowl mills per se are well-known to those skilled in the art, it is not deemed necessary, therefore, to set forth herein a detailed description of the bowl mill illustrated in FIG. 1. Rather, it is deemed sufficient for purposes of obtaining an understanding of a bowl mill 10, which is capable of being equipped with energy-efficient grinding rolls constructed in accordance with the present invention that there merely be presented herein a generalized description of the nature of the construction and the mode of operation of the components of the bowl mill 10. For a more detailed description of the nature of the construction and the mode of operation of the components of the bowl mill 10, which are not described in detail herein, one may have reference to the prior art, e.g., U.S. Pat. No. 3,465,971, which issued on Sep. 9, 1969 to J. F. Dalenberg et al. and/or U.S. Pat. No. 4,002,299, which issued Jan. 11, 1977 to C. J. Skalka.

Referring further to FIG. 1 of the drawing, the bowl mill 10 as illustrated therein includes a substantially closed separator body 12. A grinding table 14 is mounted on a shaft 16, which in turn is operatively connected to a drive mechanism (not shown) so as to be capable of being rotatably driven thereby. With the aforereferenced components arranged within the separator body 12 in the manner depicted in FIG. 1 of the drawing, the grinding table 14 is designed to be driven in a clockwise direction.

Continuing with a description of the bowl mill 10, a plurality of grinding rolls 18, preferably three in number in accord with conventional practice, are suitably supported within the interior of the separator body 12 so as to be spaced equidistantly one from another around the circumference of the latter. The nature of the construction of the grinding rolls 18 comprises the subject matter that forms the essence of the present invention. A description of the nature of the construction of the grinding rolls 18 will be found set forth hereinafter. First, however, note is made here of the fact that in the interest of maintaining clarity of illustration in the drawing only one grinding roll 18 has been shown in FIG. 1.

As further regards the grinding rolls 18, each of the latter, as best understood with reference to FIG. 1 of the drawing, is preferably supported on a suitable shaft, seen at 20 in FIG. 1, for rotation relative thereto. In addition, each of the grinding rolls 18, as best understood with reference to the grinding roll 18 of FIG. 1, is also suitably supported for movement relative to the upper surface, as viewed with reference to FIG. 1, of the grinding table 14. To this end, each of the grinding rolls 18 of the bowl mill 10 including the grinding roll 18 illustrated in FIG. 1 has a spring means, generally designated in FIG. 1 by the reference numeral 22, cooperatively associated therewith. The spring means 22, in a manner well-known to those skilled in the art of bowl mills, is operative to establish a spring loading on the grinding roll 18 associated therewith whereby the latter grinding roll 18 is made to exert the requisite degree of force on the material, e.g., coal, that is disposed on the grinding table 14 for purposes of accomplishing the desired pulverization of this coal. One spring means, which is suitable for use as spring means 22 in the bowl mill 10 of FIG. 1 of the drawing, forms the subject matter of U.S. Pat. No. 4,706,900, which issued on Nov. 17, 1987 to R. S. Prairie et al. and which is assigned to the same assignee as the present invention.

The material, e.g., coal, that is to be pulverized in the bowl mill 10 is fed thereto by means of any suitable conventional form of feed means. By way of exemplification in this regard, one such feed means that may be employed for this purpose is a belt feeder means such as the belt feeder means which is depicted schematically in FIG. 1 of the drawing and wherein the belt feeder means is generally designated by the reference numeral 24. Upon being discharged from the belt feeder means 24, the coal enters the bowl mill 10 by means of a coal supply means 26, with which the separator body 12 is suitably provided.

In accordance with the embodiment of the bowl mill 10 illustrated in FIG. 1 of the drawing, the coal supply means 26 includes a suitably dimensioned duct 28 having one end thereof which extends outwardly of the separator body 12 and which is suitably shaped as seen at 30 in FIG. 1 of the drawing so as to facilitate the collection of the coal particles leaving the belt feeder means 24, and the guiding thereafter of these coal particles into the duct 28. The other end 32 of the duct 28 of the coal supply means 26 is operative to effect the discharge of the coal on to the surface of the grinding table 14. To this end, as shown in FIG. 1 of the drawing, the duct end 32 preferably is suitably supported within the separator body 12 through the use of any suitable form of conventional support means (not shown) such that the duct end 32 is coaxially aligned with the shaft 16 that supports the grinding table 14 for rotation, and is located in spaced relation to a suitable outlet 34 provided in the classifier, generally designated by reference numeral 36, through which the coal flows in the course of being fed on to the surface of the grinding table In accord with the mode of operation of the bowl mills that embody the form of construction depicted in FIG. 1 of the drawing, a gas such as air is utilized to effect the conveyance of the coal from the grinding table 14 through the interior of the separator body 12 for discharge from the bowl mill 10. The air that is used in this regard enters the separator body 12 through a duct, denoted by the reference numeral 38 in FIG. 1 of the drawing, that is cooperatively associated with the bowl mill 10 so as to be usable for such a purpose. From the duct 38 the air flows into the separator body 12 and through the annulus, the latter being denoted in FIG. 1 by the reference numeral 40, which consists of the ring-like space that exists between the circumference of the grinding table 14 and the inner wall surface of the separator body 12. The air upon passing through the annulus 40 is deflected over the grinding table 14 preferably by means of a vane wheel assembly, constructed in accordance with the teachings of U.S. Pat. No. 4,523,721, which issued on Jun. 18,1985 to T. V. Maliszewski et al, and which is assigned to the same assignee as the present application. For purposes of maintaining clarity of illustration in the drawing only the deflector portion, the latter being seen at 42 in FIG. 1 of the drawing, of the vane wheel assembly which forms the subject matter of U.S. Pat. No. 4,523,721 has been depicted in the drawing. Moreover, it is deemed that the depiction of the deflector portion 42 in FIG. 1 of the drawing is sufficient for purposes of enabling one to obtain a complete understanding of the subject matter of the present invention to which the instant application is directed. However, should further information be desired concerning the nature of the construction and/or the mode of operation of the vane wheel assembly that the bowl mill 10, which is shown in FIG. 1, embodies, reference may be had for this purpose to U.S. Pat. No. 4,523,721.

While the air is flowing along the path described above, the coal which is disposed on the surface of the grinding table 14 is being pulverized by the action of the grinding rolls 18. As the coal becomes pulverized, the particles are thrown outwardly by centrifugal force away from the center of the grinding table 14. Upon reaching the region of the circumference of the grinding table 14, the coal particles are picked up by the air exiting from the annulus 40 and are carried along therewith. The combined flow of air and coal particles is thereafter captured by the deflector portion 42 of the vane wheel assembly constructed in accordance with the teachings of U.S. Pat. No. 4,523,721. The effect of this is to cause the combined flow of this air and coal particles to be deflected over the grinding table 14. This necessitates a change in direction of the path of flow of this combined stream of air and coal particles. In the course of effecting this change of direction, the heaviest coal particles, because they have more inertia, become separated from the air stream, and fall back on to the surface of the grinding table 14 whereupon they undergo further pulverization. The lighter coal particles, on the other hand, because they have less inertia continue to be carried along in the air stream.

After leaving the influence of the aforesaid deflector portion 42 of the vane wheel assembly constructed in accordance with the teachings of U.S. Pat. No. 4,523,721, the combined stream consisting of air and those coal particles that remain flow to the classifier 36 to which mention has been previously been had hereinbefore. The classifier 36, in accord with conventional practice and in a manner which is well-known to those skilled in this art, operates to effect a further sorting of the coal particles that remain in the air stream. Namely, those particles of pulverized coal, which are of the desired particle size, pass through the classifier 36 and along with the air are discharged therefrom and thereby from the bowl mill 10 through the outlets 44 with which the latter is provided for this purpose. On the other hand, those coal particles which in size are larger than desired are returned to the surface of the grinding table 14 whereupon they undergo further pulverization. Thereafter, these coal particles are subjected to a repeat of the process described above.

With further regard to the matter of the pulverizing, i.e., grinding, action to which the coal disposed on the grinding table 14 is subjected by the grinding rolls 18, the amount of force that must be exerted by the latter in order to effect the desired degree of pulverization of the coal will vary depending on a number of factors. For example, one important consideration in this regard is the nature of the coal itself. That is, the amount of force required to pulverize the coal will be a function of the grindability of the coal to be pulverized, i.e., the grinding characteristics of the latter. Another important factor in determining the amount of force that the grinding rolls 18 must exert to accomplish the desired degree of pulverization of the coal is the depth to which the coal is disposed on the grinding table 14, which in turn is a function of the output rate at which the bowl mill 10 is being operated.

Figure 2:
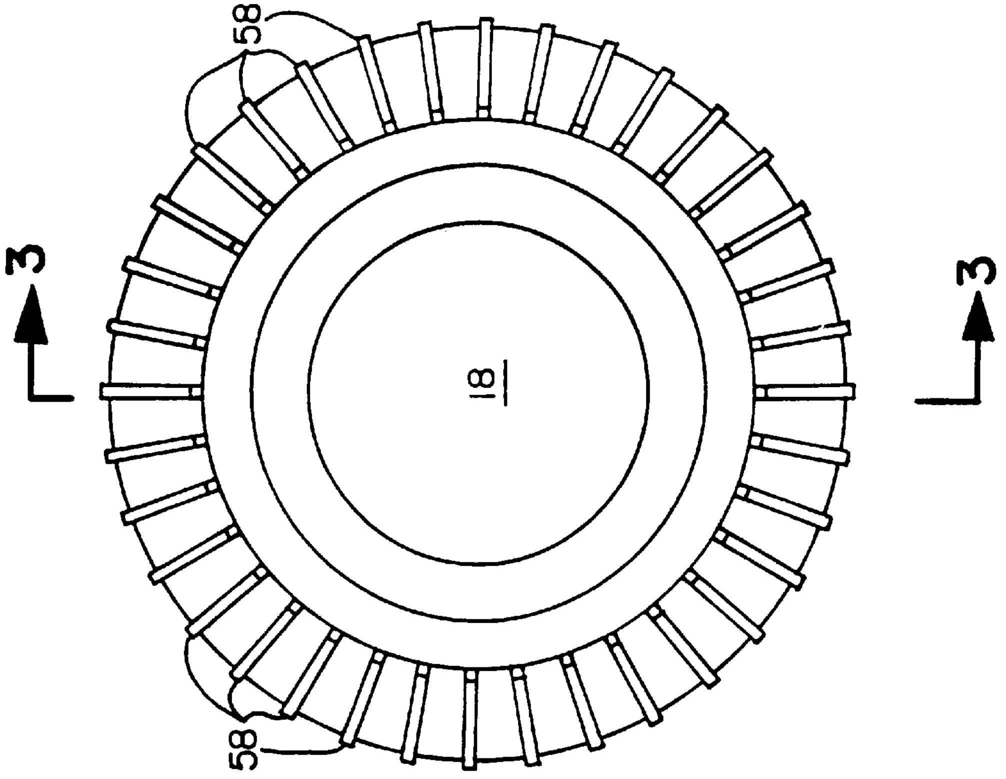
FIG. 2 is an end view of one embodiment of an energy-efficient grinding roll constructed in accordance with the present invention.
Figure 3:
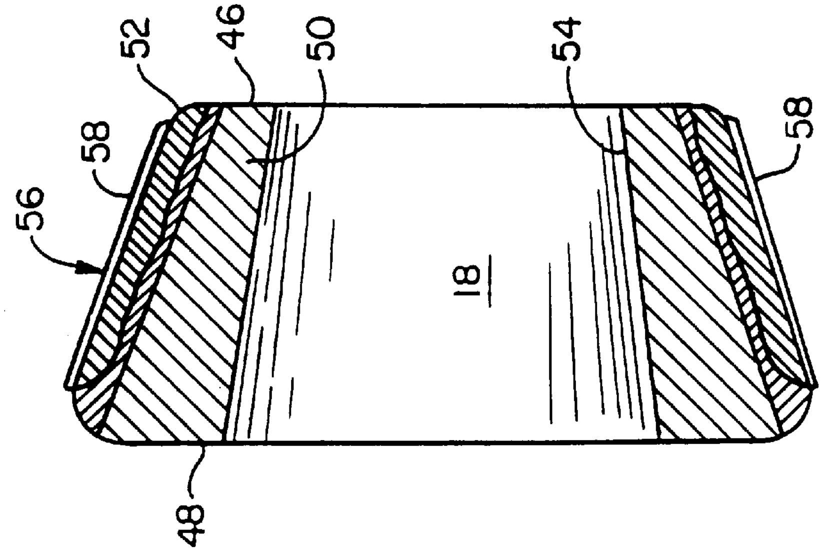
FIG. 3 is a sectional view of the energy-efficient grinding roll constructed in accordance with the present invention of FIG. 2 taken substantially along the line 3—3 in FIG. 2.
Figure 4:
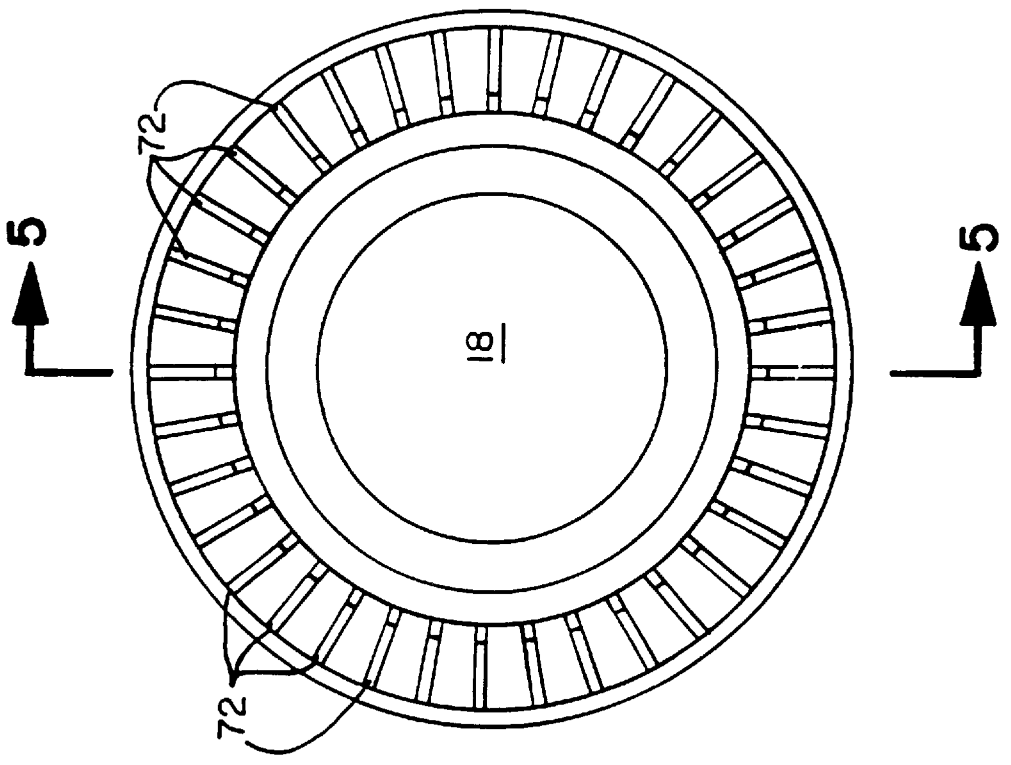
FIG. 4 is an end view of another embodiment of an energy-efficient grinding roll constructed in accordance with the present invention.
Figure 5:
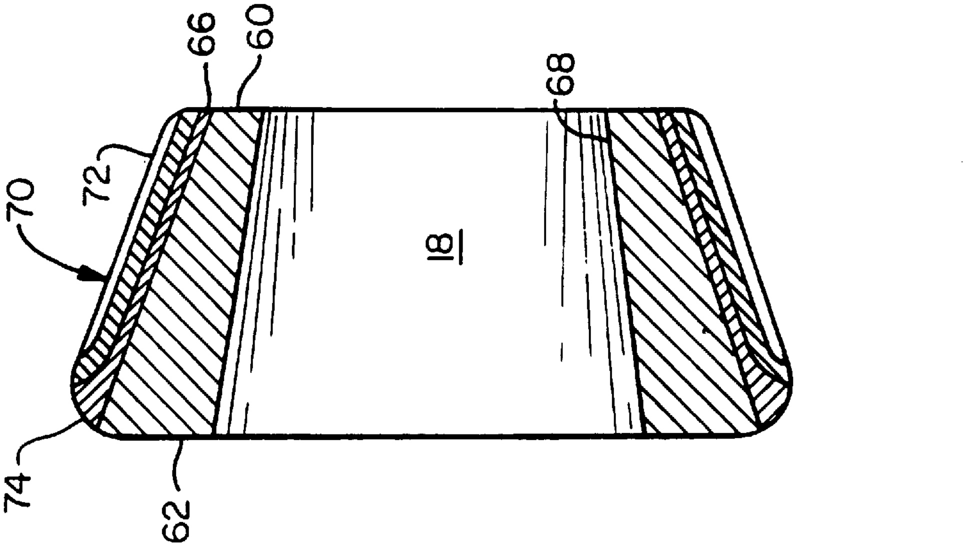
FIG. 5 is a sectional view of the energy-efficient grinding roll constructed in accordance with the present invention of FIG. 4 taken substantially along the line 5—5 in FIG. 4.

For purposes of describing the nature of the construction and the mode of operation of the energy-efficient grinding roll which in accordance with the present invention is designed to be cooperatively associated with a bowl mill constructed in the manner of the bowl mill 10 that is depicted in FIG. 1 of the drawing, reference will now be had in particular to FIGS. 2 and 3 of the drawing wherein there is depicted one embodiment constructed in accordance with the present invention of an energy-efficient grinding roll, denoted therein by the same reference numeral 18 that has been employed in FIG. 1 of the drawing to denote the grinding roll depicted therein, and to FIGS. 4 and 5 of the drawing wherein there is depicted another embodiment constructed in accordance with the present invention of an energy-efficient grinding roll, denoted therein by the reference numeral 18' for purposes of distinguishing the embodiment of energy-efficient grinding roll depicted in FIGS. 4 and 5 of the drawing from the embodiment of energy-efficient grinding roll depicted in FIGS. 2 and 3 of the drawing.

Consideration will first be given to the nature of the construction of the embodiment of energy-efficient grinding roll, i.e., energy-efficient grinding roll 18, depicted in FIGS. 2 and 3 of the drawing. To this end, the energy-efficient grinding roll 18 constructed in accordance with the embodiment of the present invention depicted in FIGS. 2 and 3 of the drawing embodies basically the configuration of a frustum of a right circular cone, which in the interest of simplification of understanding thereof may be deemed to be essentially the same as a truncated cone. As such, the energy-efficient grinding roll 18, as best understood with reference to FIGS. 2 and 3, is, generally speaking, circular in shape with one end thereof, i.e., that denoted therein by the reference numeral 46, being of a lesser diameter than the other end thereof, i.e., that denoted therein by the reference numeral 48. With further reference to FIGS. 2 and 3 of the drawing, it will be readily apparent therefrom that the energy-efficient grinding roll 18, generally speaking, consists of a main body portion, denoted by reference numeral 50, that embodies the overall configuration of a roll, and an external surface, denoted by reference numeral 52, formed of a different material, e.g., a highly abrasive resistant alloy such as that which forms the subject matter of U.S. Pat. No. 4,604,781 that issued to A. L. Rankin, III on Aug. 12, 1986 and which is assigned to the same assignee as the present invention, than that from which the body portion 50 is formed. To this end, the body portion 50 is preferably made of a relatively soft, easily machinable material such as ductile iron, while the external surface 52 is made of a relatively hard material which has good wearresistant qualities, i.e., exhibits good abrasion-resistant characteristics. Further, as best understood with reference to FIGS. 2 and 3 of the drawing, the body portion 50 has a through passage, denoted therein by the reference numeral 54, formed through substantially the center thereof. The through passage 54 is suitably dimensioned so as to be capable of receiving therewithin in assembled relation thereto the shaft 20 to which reference has been previously been made hereinbefore, and on which the grinding roll 18 is suitably supported so as to be capable of functioning in the manner desired thereof, i.e., in the manner which has been the subject of discussion herein previously.

Continuing with the description thereof, the energy-efficient grinding roll 18, as best understood with reference to FIGS. 2 and 3 of the drawing, is provided on the external surface 52 thereof with tread-like means, denoted generally by the reference numeral 56. The tread-like means 56 comprises a plurality of rib-like members, each denoted in FIGS. 2 and 3 of the drawing for ease of identification thereof by the same reference numeral, i.e., reference numeral 58. As will be described more fully hereinafter, each of the rib-like members 58 embodies preestablished dimensions, that are spaced at a preestablished distance one from another around the circumference of the external surface 52 of the energy-efficient grinding roll 18 and such that the rib-like members 58 all extend substantially in the longitudinal direction of the energy-efficient grinding roll 18. To this end, in accordance with the best mode embodiment of the invention, the spacing between adjoining ones of the rib-like members 58 is established as a function of an angle passing through the center of the energy-efficient grinding roll 18. More specifically, the spacing angle between adjoining ones of the rib-like member 58 is preferably determined in the following manner. Namely, a value, which for ease of subsequent reference thereto herein will be identified as "Y", is established that is equivalent to 0.375 multiplied by the estimated coal depth present on the grinding table 14 at the mean diameter of the energy-efficient grinding roll 18. The theoretical rib spacing angle, which for ease of subsequent reference thereto herein will be identified as "X", is calculated in accordance with the following formula: "X"=ARC COS (0.5 multiplied by the mean diameter of the energy-efficient grinding roll 18)−"Y" divided by 0.5 multiplied by the mean diameter of the energy-efficient grinding roll 18. Applying the aforereferenced formula to the energy-efficient grinding roll 18 depicted in FIGS. 2 and 3 of the drawing, the results are such that the energy-efficient grinding roll 18 as best seen with respect to FIG. 2 embodies thirty-six rib-like members 58 each equally spaced one from another. Insofar as the height of the rib-like members 58 is concerned, in accordance with the best mode embodiment of the invention, it has been found that the height of each of the rib-like members 58 should be the same and in accordance therewith that the height of each of the rib-like members 58 at the small end, i.e., the end 46, of the energy-efficient grinding roll 18 should be approximately 0.45 inches, and with the height of each of the rib-like members 58 decreasing along the length of each of the rib-like members 58 such that at the large end, i.e., the end 48, of the energy-efficient grinding roll 18 the height of each of the rib-like members 58 is approximately 0.19 inches.

The rib-like members, which may be formed of a material dissimilar from the material from which the external surface 52 is formed, may be provided on the external surface 52 through the use of any conventional means suitable for use for such a purpose such as by being welded thereto or by being cast therewith. The effect of the rib-like members 58, i.e., the tread-like means 56, has been found to be such that the rib-like members 58 function to disrupt the bed of coal present on the grinding table 14. An analogy may be drawn between the effect produced by the rib-like members 58 on the bed of coal present on the grinding table 14 and the effect produced by tire chains on a tire when driving through snow. In both instances, i.e., in the case of the rib-like members 58 and in the case of the tire chains, the effect thereof is to provide a gripping action on the surface with which each is respectively engaged, and as a consequence thereof to eliminate slippage thereof relative to the surface with which each is respectively engaged. With respect to a bowl mill, preventing such slippage has been found to translate into an energy savings insofar as concerns the amount of power consumption required between a bowl mill equipped with prior art forms of grinding rolls where slippage is found to occur between the extended surface of the grinding roll and the bed of coal present on the grinding table, and a bowl mill equipped with energy-efficient grinding rolls 18 constructed in accordance with the present invention wherein the rib-like members 58 thereof dig into, i.e., disrupt, the bed of coal present on the grinding table 14 as the grinding table 14 and thereby the bed of coal present thereon rotate relative to the energy-efficient grinding rolls 18.

Consideration will next be given herein to the energy-efficient grinding roll 18' constructed in accordance with the present invention, which is depicted in FIGS. 4 and 5 of the drawing. The energy-efficient grinding roll 18', as will be best understood with reference to FIG. 4 of the drawing, also embodies as does the energy-efficient grinding roll 18 the configuration of a truncated cone such that one end thereof, i.e., that denoted in FIG. 4 by the reference numeral 60, is of a lesser diameter than the other end thereof, i.e., that denoted in FIG. 4 by the reference numeral 62. Like the energy-efficient grinding roll 18, the energy-efficient grinding roll 18' consists of a main body portion, denoted by the reference numeral 64, that embodies the overall configuration of a roll, and an external surface, denoted by the reference numeral 66. In the same fashion as the energy-efficient grinding roll 18, the body portion 64 of the energy-efficient grinding roll 18' is preferably made of a relatively soft, easily machinable material, while the external surface 66 is made of a relatively hard material which has good wear-resistant qualities, i.e., exhibits good abrasion-resistant characteristics. The body portion 64 of the energy-efficient grinding roll 18', in the same fashion as the energy-efficient grinding roll 18, has a through passage, denoted by the reference numeral 68, formed through substantially the center thereof for the same purpose as that for which the body portion 50 of the energy-efficient grinding roll 18 is provided with the through passage 54.

Continuing the energy-efficient grinding roll 18' is provided on the external surface 66 thereof with tread-like means 70 similar in nature to the tread-like means 56 of the energy-efficient grinding roll 18. Although the function performed by the tread-like means 70 of the energy-efficient grinding roll 18' is essentially the same as the function performed by the tread-like means 56 of the energy-efficient grinding roll 18, the nature of the construction of the tread-like means 70 differs from that of the tread-like means 56. To this end, the tread-like means 70 of the energy-efficient grinding roll 18' in addition to including a plurality of rib-like members, each denoted by the same reference numeral 72 in FIGS. 4 and 5 of the drawing also, unlike the tread-like means 56 of the energy-efficient grinding roll 18, includes a cap-like portion, denoted by the reference numeral 74, located at the end 62 of the energy-efficient grinding roll 18'. The cap-like portion 74 is designed to be operative to impede the spillage of coal particles from the bed of coal present on the grinding table 14 as the grinding table 14 and thereby also the bed of coal present thereon rotate relative to the energy-efficient grinding roll 18'. The cap-like portion 74 as will be described more fully hereinafter embodies preestablished dimensions. Similarly, each of the rib-like members 72 embodies preestablished dimensions and is spaced at a preestablished distance one from another around the external surface 66 of the energy-efficient grinding roll 18'. To this end, in accordance with the best mode embodiment of the invention, the width of the cap-like portion is established in the following manner. Namely, the width of the cap-like portion 74 is established at a value, which for ease of subsequent reference thereto herein is identified as "A", equivalent to 0.1 multiplied by the length of a rib-like member 72. However, should the calculated value of "A" be less than 1.75 inches, then the width of cap-like portion 74 is made to be 1.75 inches. Insofar as the rib-like members 72 are concerned, the spacing therebetween as well as the height thereof are established in the same manner as that which has been described hereinbefore in connection with the manner in which the dimensions of the rib-like members 58 as well as the spacing therebetween are determined. Moreover, it is not deemed to be necessary, in view of this previous discussion herein of the manner in which the dimensions and spacing of the rib-like members 58 are established to reiterate this same discussion at this point with reference to the manner in which the dimensions and spacing of the rib-like members 72 are established.

Thus, in accordance with the present invention there is provided a new and improved form of grinding roll of the type that is intended to be used in pulverizers, and in particular bowl mills, for purposes of effecting the pulverization therein of material such as, for example, coal. Moreover, there is provided in accord with the present invention a grinding roll, which is characterized in that energy savings on the order of at least 15% are attainable through the use thereof in a bowl mill. Also, in accordance with the present invention there is provided an energy-efficient grinding roll, which is characterized in that energy savings are attainable therewith when such an energy-efficient grinding roll is being employed in bowl mills for purposes of effecting therewith the pulverization of coal to fineness levels below those that had heretofore been sufficient to satisfy the demands of industry. Further, there is provided in accord with the present invention an energy-efficient grinding roll, which is characterized in that energy savings are attainable therewith when such an energy-efficient grinding roll is being employed in bowl mills for purposes of effecting therewith the pulverization of coal to the fineness levels that had heretofore been sufficient to satisfy the demands of industry. In addition, in accordance with the present invention there is provided an energy-efficient grinding roll, which is characterized in that when such an energy-efficient grinding roll is employed for purposes of effecting the pulverization of coal therewith in bowl mills equipped with rotary classifiers such an energy-efficient grinding roll is operative to inhibit the initiation of "rumble" within such bowl mills when the bowl mills are being operated under normal conditions. Furthermore, there is provided in accord with the present invention an energy-efficient grinding roll, which is suitable for employment in a bowl mill that embodies a rotary classifier. Additionally, in accordance with the present invention there is provided an energy-efficient grinding roll, which is suitable for employment in a bowl mill that does not embody a rotary classifier. Besides, there is provided in accord with the present invention an energy-efficient grinding roll, which is suitable for installation in new bowl mills. Penultimately, in accordance with the present invention there is provided an energy-efficient grinding roll, which is capable of being retrofitted into existing bowl mills. Finally, there is provided in accord with the present invention an energy-efficient grinding roll, which is relatively inexpensive to provide, is easy to employ and is characterized by the energy savings that are attainable therewith as compared to the energy savings, if any, that have been possible to be realized from the grinding rolls which have heretofore been available for use for similar purposes.

While several embodiments of our invention have been shown, it will be appreciated that modifications thereof, some of which have been alluded to hereinabove, may still be readily made thereto by those skilled in the art. We, therefore, intend by the appended claims to cover the modifications alluded to herein as well as all the other modifications which fall within the true spirit and scope of our invention.

What is claimed is:

1. A method of manufacturing a grinding roll in order to thereby improve the energy efficiency thereof, the grinding roll being of the type employed in a pulverizer having a grinding surface therewithin having solid material disposed thereon wherein the grinding roll is operative to coact with the grinding surface such that the solid material is pulverized through the coaction of the grinding roll with the grinding surface, comprising the steps of:

a. forming from a first type of material a body portion embodying the configuration of a frustum of a right circular cone;

b. providing on the body portion an external portion formed of a second type of material; and c. providing on the exterior of the external portion a tread surface capable of producing a gripping action therefrom sufficient to eliminate slippage between the grinding roll and the grinding surface, the tread surface being formed of a plurality of rib members extending in the longitudinal direction of the body portion with the spacing between adjacent ones of the plurality of rib a members being established as a function of an angle passing through the center of the grinding roll and wherein this angle X is defined as:

$$X=\text{ARC COS }[((0.5)(DM)-((0.375)(ECD)]/(0.5)(DM)$$

wherein: DM=the mean diameter of the grinding roll

ECD=the estimated depth of solid material on the ginding surface at the mean diameter of the grinding roll.

2. The method as set forth in claim 1 wherein each of the plurality of rib members has a preestablished width.

3. The method as set forth in claim 2 wherein each of the plurality of rib members has a height greater at one end thereof than at the other end thereof.

4. The method as set forth in claim 3 wherein each of the plurality of rib members at the larger end thereof has a height of approximately 0.45 inches.

5. The method as set forth in claim 3 wherein each of the plurality of rib members at the smaller end thereof has a height of approximately 0.19 inches.

6. The method as set forth in claim 3 wherein each of the plurality of rib members has a height at one end thereof of approximately 0.45 inches with the height thereof decreasing to approximately 0.19 inches at the other end thereof.

7. The method as set forth in claim 1 further comprising the step of providing on the exterior of the external portion at one end thereof in encircling relation thereto a cap portion of a pre-established width.

8. The method as set forth in claim 7 wherein the cap portion has a width equal to 0.1 multiplied by the length of one of the plurality of rib members.

9. The method as set forth in claim 7 wherein each of the plurality of rib members has a predetermined width.

10. The method as set forth in claim 9 wherein each of the plurality of rib members has a height greater at one end thereof than at the other end thereof.

11. The method as set forth in claim 10 wherein each of the plurality of rib members at the larger end thereof has a height of approximately 0.45 inches.

12. The method as set forth in claim 10 wherein each of the plurality of rib members at the smaller end thereof has a height of approximately 0.19 inches.

13. The method as set forth in claim 9 wherein each of the plurality of rib members has a height at one end of approximately 0.45 inches with the height thereof decreasing to approximately 0.19 inches at the other end thereof.

14. A method of manufacturing a grinding roll in order to thereby improve the energy efficiency thereof, the grinding roll being of the type employed in a pulverizer having a grinding surface therewithin having solid material disposed thereon wherein the grinding roll is operative to coact with the grinding surface such that the solid material is pulverized through the coaction of the grinding roll with the grinding surface, comprising the steps of:

a. forming from a first type of material a body portion embodying the configuration of a frustum of a right circular cone;

b. providing on the body portion an external portion formed of a second type of material and having a pair of opposed axial ends, one of the opposed ends having a relatively smaller diameter than the other opposed end; and c. providing on the exterior of the external portion a tread surface capable of producing a gripping action therefrom sufficient to eliminate slippage between the grinding roll and the grinding surface, the tread surface being formed by a plurality of rib members circumferentially spaced from one another on the external portion and each rib member extending in the axial direction of the external portion and extending radially outwardly from the external portion at a height which decreases in the direction from the smaller diameter end of the external portion toward the larger diameter end of the external portion.

* * * * *